(12) United States Patent
Sumi et al.

(10) Patent No.: US 7,128,468 B2
(45) Date of Patent: Oct. 31, 2006

(54) HYDRODYNAMIC BEARING, METHOD OF MANUFACTURING THE SAME, METHOD OF MANUFACTURING SHAFT MEMBER FOR HYDRODYNAMIC BEARING, SPINDLE MOTOR, AND RECORDING DISK DRIVING APPARATUS

(75) Inventors: Shigeharu Sumi, Kyoto (JP); Takeshi Ohiro, Kyoto (JP); Tatsuya Yoshida, Kyoto (JP)

(73) Assignee: Nidec Corporation, Kyoto (JP)

( * ) Notice: Subject to any disclaimer, the term of this patent is extended or adjusted under 35 U.S.C. 154(b) by 104 days.

(21) Appl. No.: 10/829,332

(22) Filed: Apr. 22, 2004

(65) Prior Publication Data
US 2004/0213489 A1    Oct. 28, 2004

(30) Foreign Application Priority Data
Apr. 22, 2003  (JP) .............................. 2003-116714
Mar. 1, 2004   (JP) .............................. 2004-055771

(51) Int. Cl.
*F16C 17/10*    (2006.01)
(52) U.S. Cl. ...................................... 384/107
(58) Field of Classification Search ................ 384/107, 384/112, 113, 123, 114
See application file for complete search history.

(56) References Cited

U.S. PATENT DOCUMENTS
2003/0174916 A1* 9/2003 Aiello .......................... 384/112

FOREIGN PATENT DOCUMENTS
| JP | A-2003-324753 | 11/2000 |
| JP | A-2002-168240 | 6/2002 |
| JP | A-2003-56567 | 2/2003 |
| JP | A-2003-97545 | 4/2003 |

* cited by examiner

*Primary Examiner*—Lenard A. Footland
(74) *Attorney, Agent, or Firm*—Judge & Murakami IP

(57) ABSTRACT

According to the invention, a shaft as a component of a shaft member of a hydrodynamic bearing and a disc member such as a thrust plate are joined to each other by welding by a simple method with high precision. A shaft having a cylindrical outer circumferential surface, in joint surfaces which are joined to each other of the shaft and a disc member having a flat surface facing an end surface of the shaft, a circumferential projection having a diameter smaller than the outside diameter of the shaft and projected in the axial direction and a recess at least of which outer periphery has a diameter smaller than the outside diameter of the shaft and larger than the diameter of the projection and has a circular shape are provided.

17 Claims, 8 Drawing Sheets

22a(24a)

(a)

(b)

HYDRODYNAMIC BEARING, METHOD OF MANUFACTURING THE SAME, METHOD OF MANUFACTURING SHAFT MEMBER FOR HYDRODYNAMIC BEARING, SPINDLE MOTOR, AND RECORDING DISK DRIVING APPARATUS

CROSS REFERENCE TO RELATED APPLICATION

This application is based on and incorporates herein by reference Japanese Patent Applications No. 2003-116714 filed on Apr. 22, 2003 and No. 2004-055771 filed on Mar. 1, 2004.

BACKGROUND OF THE INVENTION

1. Field of the Invention

The present invention relates to a hydrodynamic bearing in which a shaft member is constructed by joining and fixing a disc member such as a disc-shaped thrust plate to a shaft and a method of manufacturing the same, an apparatus of manufacturing a shaft member for a hydrodynamic bearing, a spindle motor having the hydrodynamic bearing, and a recording disk driving apparatus for rotating a recording disk by a spindle motor.

2. Background Information

Hitherto, as a bearing of a motor for rotating a recording disk in a hard disk driving apparatus, a removable disk driving apparatus, or the like, various hydrodynamic bearings for rotatably supporting a rotor by generating a dynamic pressure by a lubrication fluid such as oil held in a space between a shaft and a sleeve at the time of rotation of the motor have been proposed. Such a hydrodynamic bearing is constructed by, for example, a radial hydrodynamic bearing part and a thrust hydrodynamic bearing part. A shaft part (shaft member) is constructed by a shaft having a cylindrical outer circumferential surface and a thrust plate (disc member) provided so as to be substantially orthogonal to the axis of the shaft. The radial hydrodynamic bearing part is constructed in the outer circumferential surface of the shaft, and the thrust hydrodynamic bearing part is constructed in the flat surface of the thrust plate.

As a method of fixing the shaft and the thrust plate to each other, for example, a method disclosed in Japanese Unexamined Patent Publication (JP-A) No. 2000-324753 is known. In the method, the thrust plate is formed in an annular shape and is press fit to the outer circumferential surface at one end of the shaft, and a joint part between the end surface of the shaft and the thrust plate is fixed by laser welding. There is another known method disclosed in JP-A No. 2003-097545 in which a screw part is provided for each of the outer circumferential surface of an end portion of a shaft and the inner circumferential surface of an annular thrust plate and the screw parts are screwed to each other, thereby fixing the shaft and the thrust plate to each other.

In recent years, application of a recording disk driving apparatus used for an apparatus such as a personal computer to a smaller portable information terminal has been started. A spindle motor mounted on a driving apparatus of this kind is requested to have high-speed and high-precision rotation which are conventionally demanded and, in addition, smaller size, reduced thickness, lower cost, and lower power consumption.

To address such requests, however, the dimension in the axial direction of the shaft has to be shortened. In the case of using both press fitting and laser welding disclosed in JP-A No. 2000-324753 and the case of fixing the shaft and the thrust plate by screwing disclosed in JP-A No. 2003-097545, to maintain the perpendicularity of the thrust plate to the axis of the shaft with high precision, the thrust plate has to be thick to a certain extent. Consequently, it is difficult to sufficiently assure the support length of the shaft by the radial hydrodynamic bearing part.

In a spindle motor, holding of the posture of the rotor such as whirling during rotation of the rotor on which a recording disk is mounted thoroughly depends on the radial hydrodynamic bearing part. Therefore, to stably hold the posture of the rotor, the support length of the shaft by the radial hydrodynamic bearing part has to be sufficiently assured. It is, however, very difficult to make the motor smaller and thinner as a whole while maintaining the requested rotation precision.

JP-A No. 2002-168240 discloses a method of integrally forming a shaft and a thrust plate in order to reduce the thickness of the thrust plate. JP-A No. 2003-056567 discloses a method of fixing a shaft and a disc-shaped thrust plate by performing resistance welding on the axial part.

According to the method of integrally forming the shaft and the thrust plate (JP-A No. 2002-168240) and the method of fixing the shaft and the disc-shaped thrust plate by resistance welding (JP-A No. 2003-056567), the motor can be made smaller and thinner as a whole while maintaining the requested rotation precision. However, there are still the following technical problems.

Consequently, a molding method by casting is not suitable for a member as a component of the hydrodynamic bearing, such as the shaft and the thrust plate. The reason is that a number of small holes are formed in the surface of the member by casting and, in the case of performing a finishing process by cutting the surface of the shaft or thrust plate (surface precision process) after the casting process, metal particles such as powders generated at the time of cutting enter the small holes and cannot be easily removed perfectly by cleaning. If the hydrodynamic bearing is used while the metal particles such as powders remain on the surface of the members, the metal particles in the small holes are gradually raked out by the flow of a lubrication fluid by rotation and are mixed into the lubrication fluid, so that it causes problems such as seize, damage, and the like of the bearing.

Consequently, a method of forming the shaft and the thrust plate by a cutting process of, for example, cutting a metal rod member is common. In the case of forming the shaft and the thrust plate integrally as disclosed in JP-A No. 2002-168240, a metal rod member having a diameter larger than that of the thrust plate extended in a flange shape from the outer circumferential surface of the shaft is cut, so that long time is required for the processing, the yield deteriorates, and productivity decreases. Since the member is much wasted, it may disturb reduction in the cost.

In addition, in the case of integrally forming the shaft and the thrust plate, when a finishing process is performed on the flat surface of the thrust plate as a component of the thrust hydrodynamic bearing part, a grinding relief for finishing the bearing surface by grinding has to be provided for the root portion of the shaft (the corner portion between the shaft and the thrust plate). The grinding relief is created by a process of preliminarily removing a portion with which a grinding stone does not come into contact, of the corner in the root portion. Consequently, to assure the area of the flat surface of the thrust plate and obtain necessary support rigidity in the thrust direction, the diameter of the thrust plate has to be also increased. Therefore, the viscous resistance of the lubricant fluid at the time of rotation in the radial hydrodynamic bearing part and the thrust hydrodynamic bearing part increases, and the rotation load of the motor increases, so that a power consumption amount also increases.

In the method of fixing the shaft and the disc-shaped thrust plate by resistance-welding the axial portions of them (JP-A No. 2003-056567), problems such as increase in the cost and power consumption amount like in the case of integrally forming the shaft and the thrust plate can be avoided. However, since the resistance welding is performed in a state where a projection provided around the axis of the shaft and the thrust plate are in point-contact with each other, the stress and heat occurring when the shaft and the thrust plate are pressurized and pressed against with each other are concentrated in the projection portion of the shaft. It is therefore feared that a deformation such as deflection occurs in the case of using a thin thrust plate. Further, since the resistance welding is performed around the axis of the shaft, it is difficult to assure a sufficient welding area and it is also feared that the welding strength varies. If a heavy voltage is applied or current carrying time is increased to prevent such variations in the welding strength, new problems occur such as melting of an electrode contact portion between the shaft and the thrust plate and occurrence of so-called weld dusts created when the temperature in the welded portion becomes too high and a melted metal drifts.

When deflection occurs in the thrust plate as a component of the thrust hydrodynamic bearing part, naturally, the support precision deteriorates, so that the thrust plate cannot rotate stably. Since the weld dusts cannot be completely removed even by cleaning like the metal particles, it may cause seize or damage in the bearing part.

Further, in the case of joining the shaft and the thrust plate to each other by resistance welding, to eliminate the influence of variations in dimensional precision due to process tolerances and to join the members at high precision to an extent that it does not exert an influence on the axis support, it is necessary to absorb the variations in dimensional precision by an axis adjusting jig for adjusting the axes of the shaft and the thrust plate at the time of welding.

The problems as described above occur not only in the case of joining the thrust plate as a component of the thrust hydrodynamic bearing part to the shaft as a component of the radial hydrodynamic bearing part but also in the case of joining another disc member such as a disc-shaped member for preventing coming off to the shaft as a component of the radial hydrodynamic bearing part.

SUMMARY OF THE INVENTION

An object of the invention is to provide a hydrodynamic bearing having a shaft member constructed by fixing a disc member to an end surface of a shaft and a bearing member constructing a radial hydrodynamic bearing part in cooperation with the shaft member and capable of rotating relative to the shaft member, realizing smaller size and reduced thickness of the bearing as a whole and lower cost and lower power consumption while maintaining required rotation precision.

To achieve the object, according to the invention, a shaft having a cylindrical outer circumferential surface, in joint surfaces which are joined to each other of the shaft and a disc member having a flat surface facing an end surface of the shaft, a circumferential projection having a diameter smaller than the outside diameter of the shaft and projected in the axial direction and a recess at least of which outer periphery has a diameter smaller than the outside diameter of the shaft and larger than the diameter of the projection and has a circular shape are provided. By applying a predetermined voltage across the shaft and the disc member in a state where the joint surface of the shaft and the joint surface of the disc member are in contact with each other, the projection is melted. The melted matter is housed in the recess. The end surface of the shaft and the flat surface of the disc member are in contact with each other in a portion outside of the recess, and the shaft and the disc member are integrated by welding.

The projection may be provided for the end surface of the shaft or the flat surface of the disc member. The recess may be provided in the end surface of the shaft or the flat surface of the disc member. At the time of welding the shaft and the disc member, it is important to melt the projection and house a melt matter created by the melting into the recess. The end surface of the shaft and the flat surface of the disc member come into contact with each other in the portion outside of the recess in the process of melting the projection, thereby enabling the shaft and the disc member to be integrally fixed to each other by welding in a state where the flat surface of the disc member is orthogonal to the axis of the shaft.

Another object of the invention is to provide a method of manufacturing a hydrodynamic bearing realizing smaller size, reduced thickness, and lower cost while maintaining required support rigidity and precision, and a method of manufacturing a shaft member used for the hydrodynamic bearing.

Further another object of the invention is to provide an apparatus for manufacturing a hydrodynamic bearing capable of holding a shaft and a disc member such as a thrust plate joined by resistance welding with high concentricity and realizing high-precision joining.

Further another object of the invention is to provide a spindle motor realizing smaller size and reduced thickness as a whole while maintaining required rotation precision and also realizing lower cost and lower power consumption.

Further another object of the invention is to provide a recording disk driving apparatus on which a spindle motor realizing smaller size and reduced thickness as a whole while maintaining required rotation precision and also realizing lower cost and lower power consumption is mounted.

BRIEF DESCRIPTION OF THE DRAWINGS

Referring now to the attached drawings which form a part of this original disclosure.

DETAILED DESCRIPTION OF THE PREFERRED EMBODIMENTS

Embodiments of the invention will be described with reference to the drawings.

(1) Configuration of Spindle Motor

Figure 1:
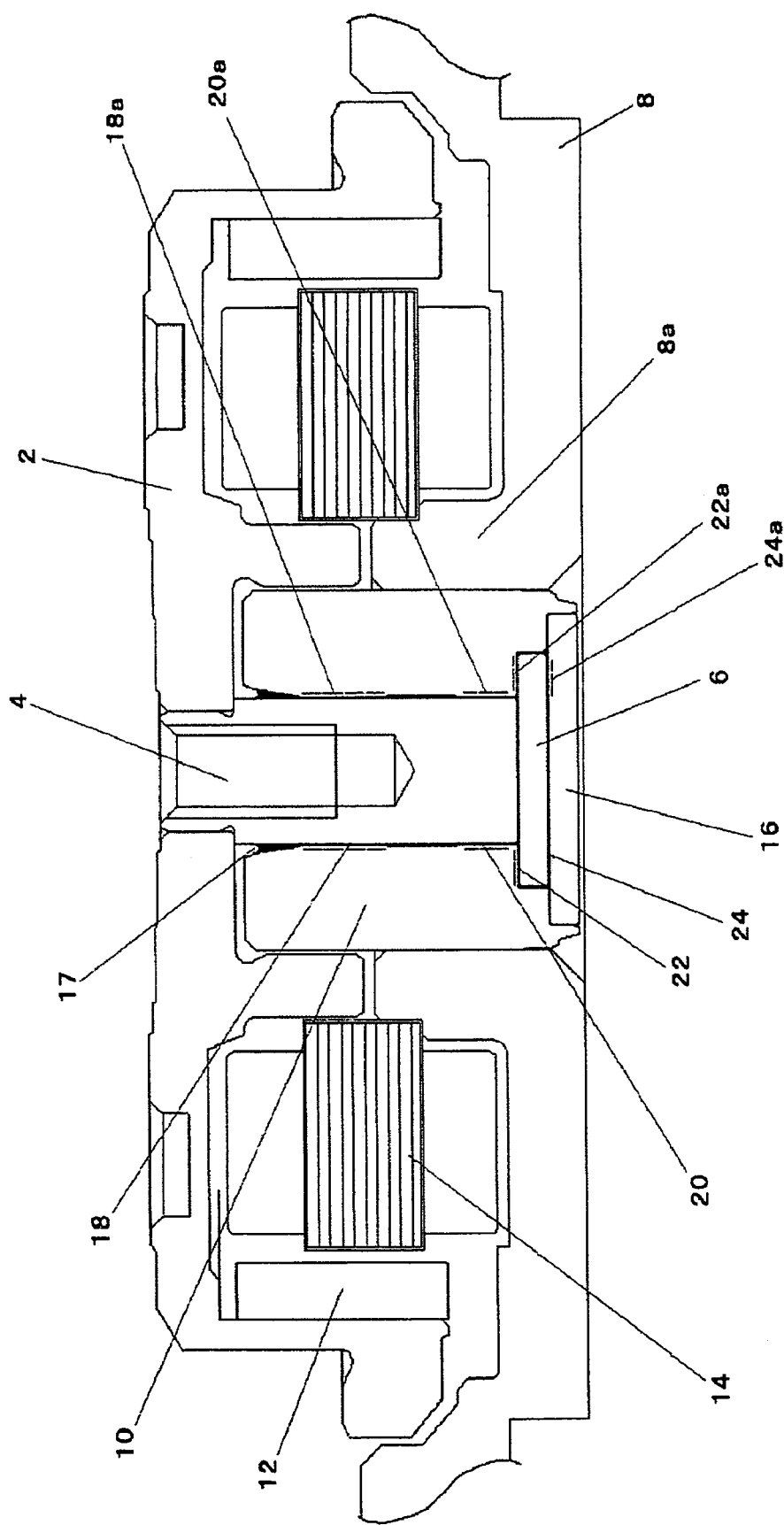
FIG. 1 is a cross section showing a schematic configuration of a hydrodynamic bearing according to the invention and a spindle motor using the same.

A spindle motor according to an embodiment of the invention shown in FIG. 1 has: a rotor including a rotor hub 2 in which a hard disk (indicated as a disk plate 53 in FIG. 8) is held in a peripheral portion, a shaft 4 having a cylindrical outer circumferential surface attached to the rotor hub 2, and a disc-shaped thrust plate 6 as a disc member extended from an outer circumferential surface of a free end (an end on the side opposite to the side attached to the rotor hub 2) of the shaft 4 to the outside in the radial direction; and a sleeve 10 fixed to a cylindrical boss 8a provided for a bracket 8. A rotor magnet 12 is attached to the inner surface side of the rotor hub 2 by means such as bonding, and a stator 14 is disposed for the bracket 8 so as to face the rotor magnet 12 in the radial direction.

Figure 2:
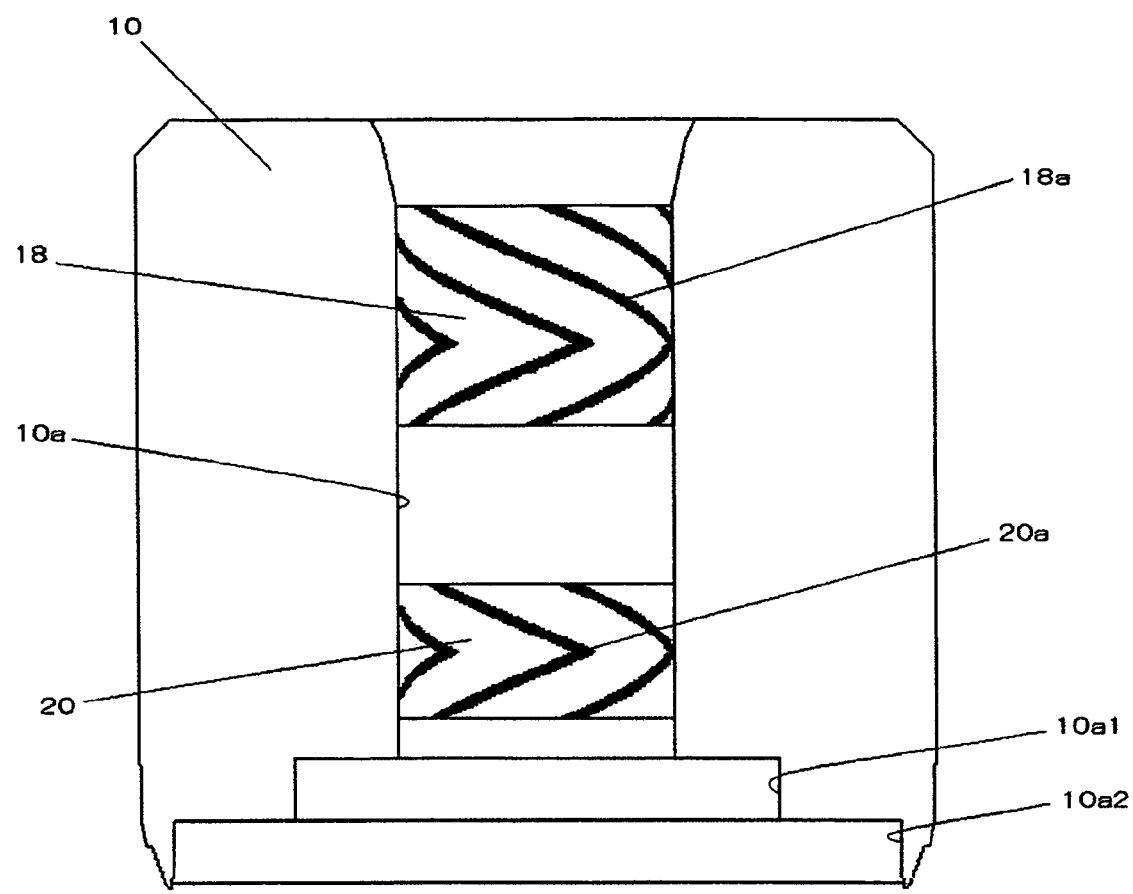
FIG. 2 is a cross section schematically showing a sleeve in FIG. 1.

In the sleeve 10, as shown in FIG. 2, a through hole 10a penetrating the sleeve 10 in the axial direction and forming a cylindrical inner circumferential surface is formed. A small gap is formed between the cylindrical outer circumferential surface of the shaft 4 and the cylindrical inner circumferential surface of the through hole 10a, and the shaft 4 is inserted in the sleeve 10. On the side of one of openings of the hole 10a (on the bracket 8 side), a first step 10a1 is formed in correspondence with the thrust plate 6, and a second step 10a2 having an inner diameter larger than that of the through hole 10a, continued from the first step 10a1 and, further; having the inner diameter larger than that of the first step 10a1 is formed. A gap is formed between a flat surface of the first step 10a1 and the top surface of the thrust plate 6, and a gap is formed between the inner circumferential surface of the first step 10a1 and the outer circumferential surface of the thrust plate 6. A thrust bush 16 for closing an opening of the through hole 10a is attached to the second step 10a2. By the thrust bush 16, a gap is formed between the lower surface of the thrust plate 6 and the side surface of the free end of the shaft 4.

The small gap formed between the inner circumferential surface of the through hole 10a and the outer circumferential surface of the shaft 4, the small gap between the flat surface of the first step 10a1 and the upper side surface of the thrust plate 6, the gap between the inner circumferential surface of the first step 10a1 and the outer circumferential surface of the thrust plate 6 and, further, the gap between the thrust bush 16 and the lower surface of the thrust plate 6 are communicated with each other. In the communicated gaps, a lubricant fluid such as oil is held without interruption. An upper end portion (an end portion on the rotor hub 2 side) of the inner circumferential surface of the through hole 10a in the sleeve 10 is tapered so that the dimension in the radial direction of the small gap formed with the outer circumferential surface of the shaft 4 gradually increases to the rotor hub 2 side. The interface of oil is formed between the tapered inner circumferential surface of the through hole 10a and the outer circumferential surface of the shaft 4 and functions as a taper seal 17.

(2) Configuration of Bearing

Figure 3:
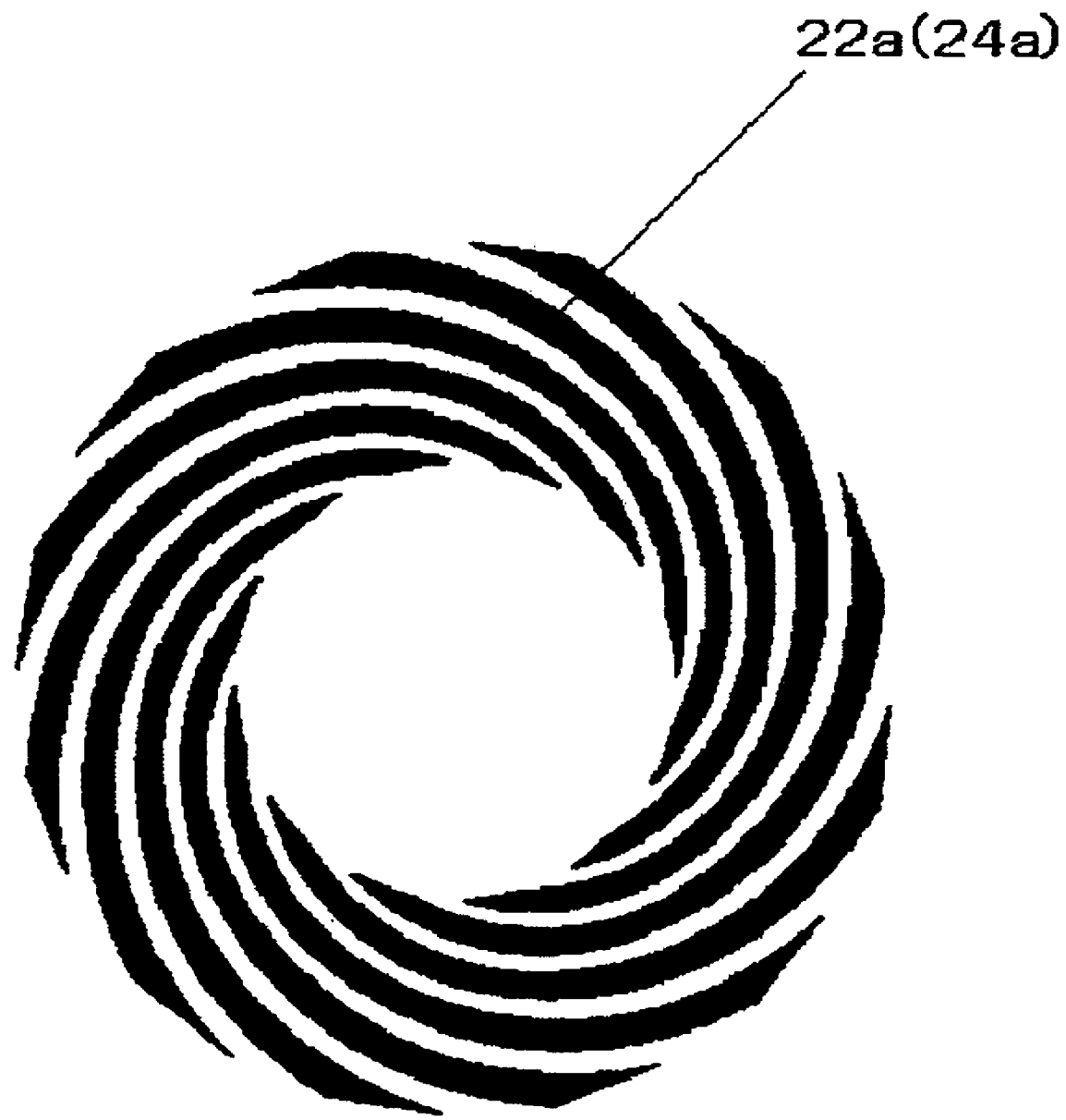
FIG. 3 is a schematic diagram showing a spiral groove formed in a thrust hydrodynamic bearing part in FIG. 1.

With reference to FIGS. 1 to 3, the bearing parts will be described.

As shown in FIG. 2, in the inner circumferential surface of the through hole 10a of the sleeve 10, a series of circumferential dynamic pressure generating grooves is formed by herringbone grooves 18a each having an almost V shape constructed by connecting a pair of spiral grooves inclined in opposite directions with respect to the rotating direction to the inside in the axial direction of the taper seal 17. An upper radial hydrodynamic bearing part 18 is constructed between the inner circumferential surface of the through hole 10a and the outer circumferential surface of the shaft 4.

The herringbone groove 18a in the upper radial hydrodynamic bearing part 18 is formed in such a manner that the spiral grooves are asymmetrically with respect to the coupled part, that is, in a shape which is unbalanced in the axial direction so that the pumping force of the spiral groove provided on the upper side in the axial direction (the taper seal 17 side) is higher than that of the spiral groove provided on the lower side in the axial direction (the thrust plate 6 side).

In the inner circumferential surface of the through hole 10a of the sleeve 10, adjacent to the first step 10a1, a series of circumferential dynamic pressure generating grooves for inducing a fluid dynamic pressure in the oil at the time of rotation of the rotor 6 is formed by herringbone grooves 20a each having an almost V shape constructed by connecting a pair of spiral grooves inclined in opposite directions. A lower radial hydrodynamic bearing part 20 is constructed between the inner surface of the through hole 10a and the outer circumferential surface of the shaft 4.

The herringbone grooves 20a formed in the lower radial hydrodynamic bearing part 20 are set in such a manner that the spiral grooves have substantially the same inclination angle with respect to the rotational axis, groove depth, total length, and width dimension, that is, the spiral grooves are line symmetrical with respect to the coupled part so that the spiral grooves generate substantially the same pumping forces.

A series of dynamic pressure generating grooves as spiral grooves 22a are formed concentrically with the thrust plate 6 in the flat surface of the first step 10a1 formed in the sleeve 10, and an upper thrust hydrodynamic bearing part 22 is formed between the flat surface of the first step 10a1 and the upper surface of the thrust plate 6. The spiral grooves 22a have, as shown in FIG. 3, a pump-in shape so that a dynamic pressure to make the oil act to the inside in the radial direction, that is, onto the shaft 4 side in accordance with the rotation of the thrust plate 6 is generated. By the hydrodynamic pressure generated by the spiral grooves 22a, an axis supporting force that the thrust plate 6 acts in the direction of moving apart from the first step 10a1 is obtained.

Further, in the inner surface of the thrust bush 16 facing the under surface of the thrust plate 6 in the axial direction, a series of dynamic pressure generating grooves as spiral grooves 24a is formed concentrically with the thrust plate 6, and a lower thrust hydrodynamic bearing part 24 is formed between the inner surface of the thrust bush 16 and the under surface of the thrust plate 6. Like the spiral grooves 22a formed in the upper thrust hydrodynamic bearing part 22, the spiral grooves 24a have a pump-in shape so that a dynamic pressure to make the oil act to the inside in the radial direction, that is, to the rotation center side of the thrust plate 6 in accordance with the rotation of the thrust plate 6 is generated. By the hydrodynamic pressure generated by the spiral grooves 24a, the thrust plate 6 floats from the thrust bush 16. Since a concrete shape of the spiral grooves 24a is similar to that of the spiral grooves 22a formed in the upper thrust hydrodynamic bearing part 22, it is not shown but FIG. 3 may be used for reference.

As described above, by using the spiral grooves 22a and 24a as the dynamic pressure generating grooves formed in the upper and lower thrust hydrodynamic bearing parts 22 and 24, as compared with the case of providing herringbone grooves as the dynamic pressure generating grooves in the thrust hydrodynamic bearing parts, the efficiency of the bearing is improved.

Specifically, the herringbone groove has the shape of an almost V shape constructed by a pair of spiral grooves which are inclined in the opposite directions with respect to the rotation direction. By pumping oil from both ends of the bearing part to the coupled part of the spiral grooves at the time of rotation of the rotor, a mountain-shaped pressure distribution in the axial direction using the coupled part of the spiral grooves as an apex is obtained.

In contrast, by the spiral grooves 22a and 24a, a pressure distribution which has an almost trapezoid shape in the radial direction is obtained, in which the pressure is the highest in the center portion of the bearing part, that is, in the outer circumferential portion of the shaft 4 in the upper thrust hydrodynamic bearing part, and in the rotation axis portion of the shaft 4 in the lower thrust hydrodynamic bearing 24. Therefore, as compared with the case where the herringbone grooves are provided as the dynamic pressure generating grooves, the effective area corresponding to load support can be enlarged. In the case of applying the bearing to a spindle motor of the same load, the outside diameter of the thrust plate 6 can be reduced and the circumferential speed is maintained to below. Thus, a loss caused by viscosity resistance of the lubricant fluid can be suppressed.

In other words, as compared with the case where the herringbone grooves are applied as the dynamic pressure generating grooves of the thrust hydrodynamic bearing part, while maintaining equivalent load performance (load supporting force), a loss is reduced, and the power consumption amount of the spindle motor can be suppressed.

Figure 4:
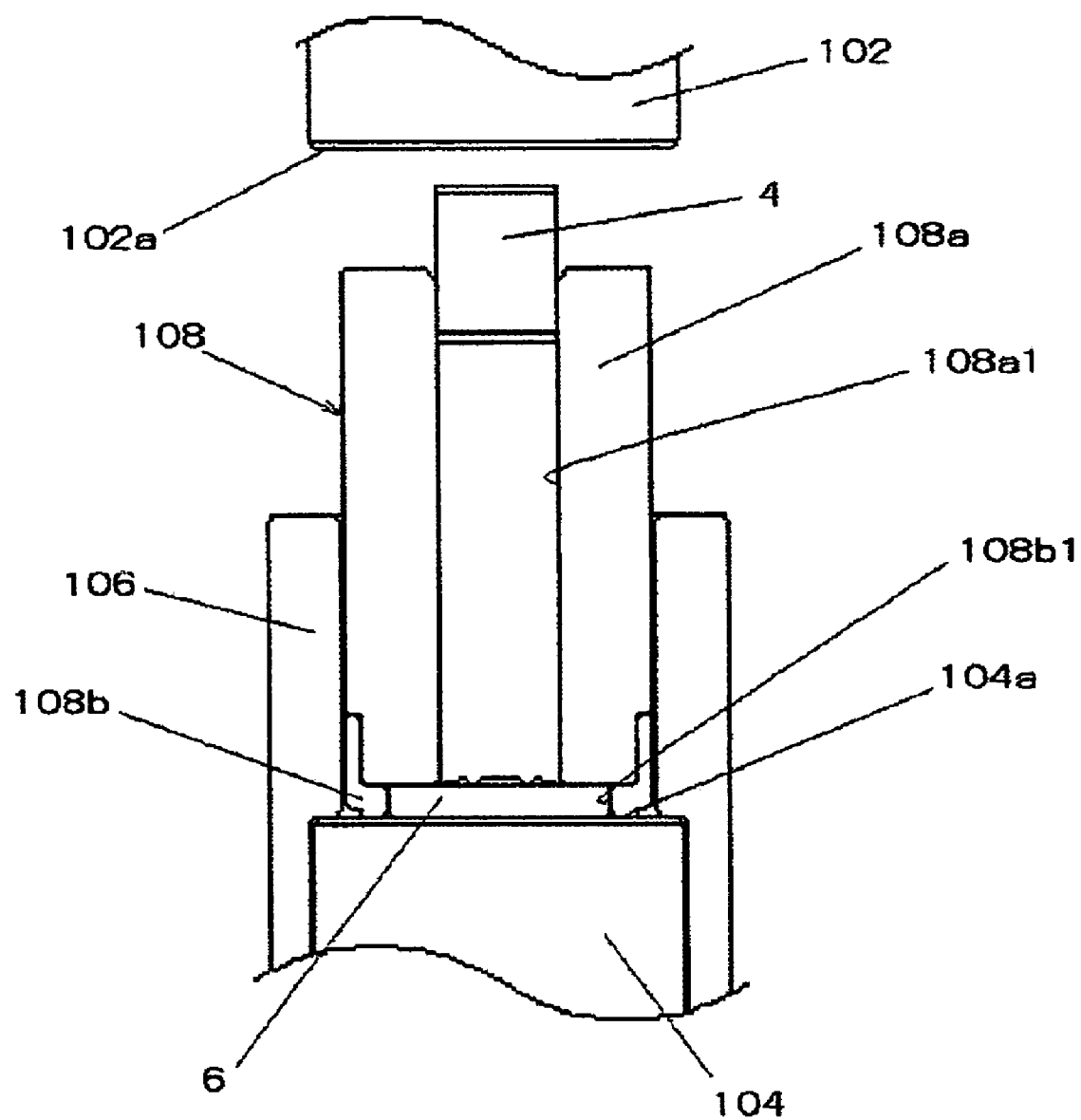
FIG. 4 is a schematic configuration diagram of an apparatus used for joining a shaft and a thrust plate.

(3) Method of Joining Shaft and Thrust Plate and Configuration of Apparatus used for Joining The shaft 4 and the thrust plate 6 are joined to each other by a resistance welding method using a joining apparatus shown in FIG. 4. The resistance welding method is a method of passing a current to a portion to be welded and applying a pressure while heating the portion by the Joule's heat.

The joining apparatus has, as shown in FIG. 4, a pair of upper and lower electrodes 102 and 104 connected to an external DC power source and a current passage control means (not shown) The lower electrode 104 is fit in an enclosure 106 having a hollow cylindrical shape. In the enclosure 106, a jig 108 for adjusting the axes of the shaft 4 and the thrust plate 6 is also inserted. The axis adjusting jig 108 is constructed by a shaft holding part 108a in which an axis adjusting hole 108a1 penetrating in the axial direction and for positioning the axis of the shaft 4 in a predetermined position is formed, and an annular thrust plate holding part 108b which is positioned in an end on the lower side in the axial direction of the axis adjusting hole 108a1 and is coaxial with the jig adjusting hole 108a1 and which adjusts the axis of the thrust plate 6 by its inner circumferential surface 108b1.

The thrust plate holding part 108b has an annular wall which projects in the axial direction from the outer side of the inner circumferential surface 108b1 by which the thrust plate 6 is held. The annular wall is attached by means such as bonding to a step provided in the outer circumferential surface of an lower end in the axial direction of the shaft holding part 108a (an end portion on the lower electrode 104 side). Although the enclosure 106 and the shaft holding part 108a are made of an insulating ceramic material such as alumina, they may be formed by performing a process such as insulating coating on the surface of a conductive material. The thrust plate holding part 108b is formed of a relatively hard resin such as polyacetal resin. Further, the electrodes 102 and 104 are coated with an insulating material except for electrode surfaces 102a and 104a.

Figure 5:
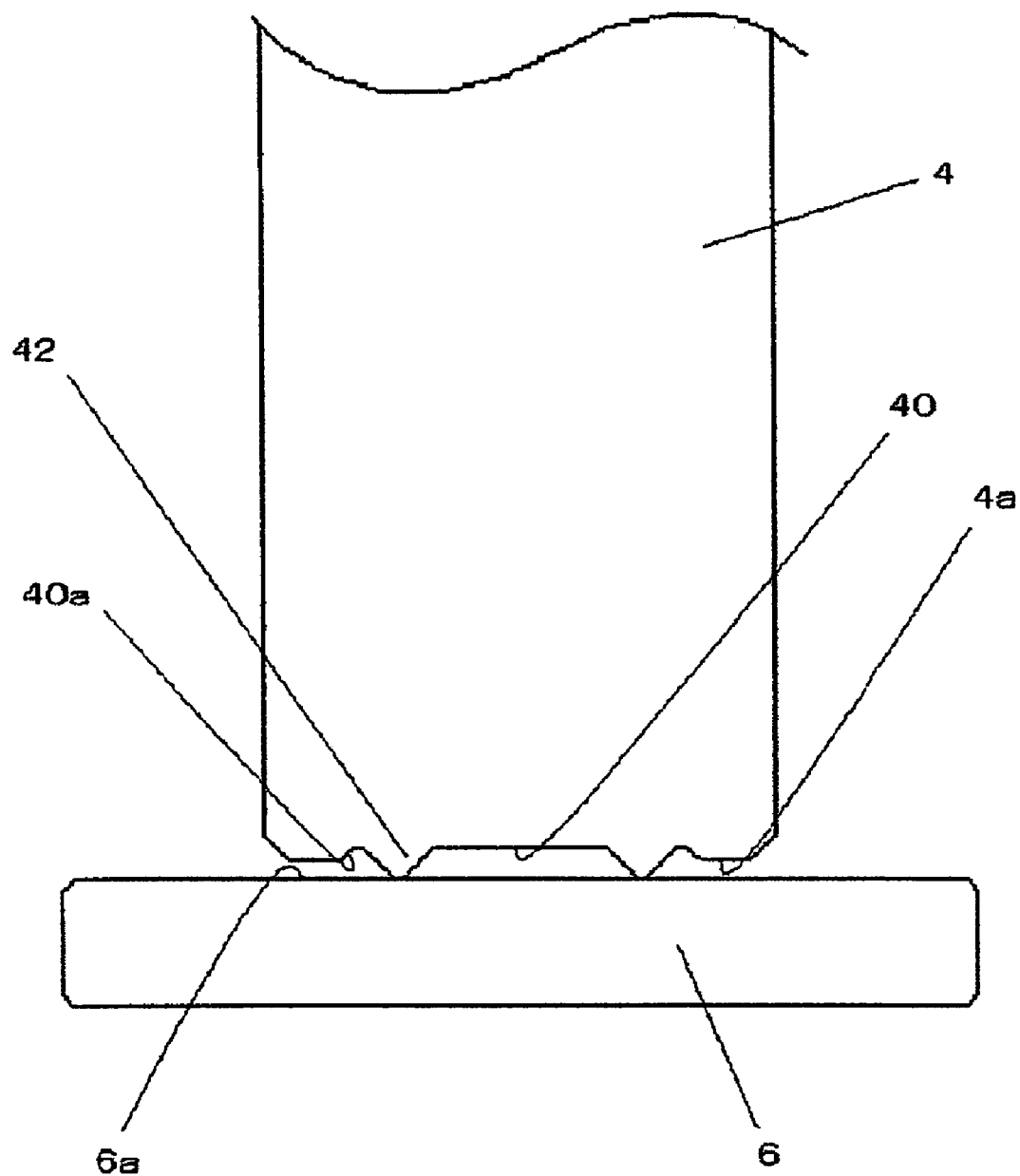
FIG. 5 is an enlarged view of a portion around joint surfaces of the thrust plate and the shaft.

FIG. 5 is an enlarged view of a portion around joint surfaces of the shaft 4 and the thrust plate 6. An end surface 4a of the shaft 4 and a top surface 6a of the thrust plate 6 will be called joint surfaces 4a and 6a, respectively, in the following description. The shaft 4 is made of stainless steel having conductivity such as SUS420F in consideration of characteristics of hardness, wear resistance and the like. In the joint surface 4a, as shown in FIG. 5, a circular recess 40 as a melted matter receiving recess and a circumferential projection 42 in a position apart from an outer circumferential wall 40a of the recess 40 are formed so as to surround the axis. The projection 42 is almost concentric with the recess 40 and has a sectional shape of an almost triangle or trapezoid. The height of the projection 42 is set so that the projection projects from the joint surface 4a in the axial direction by about 0.1 mm to 0.2 mm. The thrust plate 6 is formed of the same material as that of the shaft 4 in consideration of conduction resistance and the like.

The shaft 4 and the thrust plate 6 are joined to each other by the following method by resistance welding. First, the thrust plate 6 is press fit into the inner circumferential surface 108b1 of the thrust plate holding part 108b, and the shaft 4 is inserted into the axis adjusting hole 108a1 in the shaft holding part 108a until the projection 42 comes into contact with the joint surface 6a of the thrust plate 6. Subsequently, the axis adjusting jig 108 is lowered in the axial direction so as to be fit in the enclosure 106, and the thrust plate 6 is allowed to come into contact with the electrode surface 104a of the lower electrode 104.

By setting the inside diameter of the axis adjusting hole 108a1 to be larger than the outside diameter of the shaft 4 by about 0.002 mm to 0.005 mm and setting the inside diameter of the inner circumferential surface 108b1 of the thrust plate holding part 108b to be larger than the outside diameter of the thrust plate 6 by about 0.005 mm to 0.01 mm, the axis adjusting jig 108 can be easily attached/detached and the coaxiality between the axis of the shaft 4 and the center of the thrust plate 6 can be adjusted with precision. Further, the thrust plate 6 is press fit and held in the inner circumferential surface of the thrust plate holding part 108b made of resin, variations in the dimensional precision caused by process tolerance or the like of the thrust plate 6 are absorbed by the thrust plate holding part 108b, and the center position of the thrust plate 6 can be positioned with high precision.

In a state where the axis of the shaft 4 and the center of the thrust plate 6 are adjusted by the axis adjusting jig 108, the electrode surface 102a of the upper electrode 102 is lowered by an energizing mechanism (not shown) until it comes into contact with the upper end surface of the shaft 4. In a state where the joint surfaces 4a and 6a of the shaft 4 and the thrust plate 6 are in contact with each other, while applying a pressure of about 50 kgf to the joint surfaces 4a and 6a by the energizing mechanism, a direct voltage of about 10 volts (V) is applied across the electrodes 102 and 104 for about 0.003 second. The effective current in this case is about 3,000 ampere (A).

By the operation, the tip of the circumferential projection 42 provided for the shaft 4 and the portion in contact with the projection 42 in the joint surface 6*a* of the thrust plate 6 are melted. When the energizing is finished, a melted matter is solidified soon, thereby completing joint between the shaft 4 and the thrust plate 6. At the time of the joint, both of the members are attracted to each other by metal coupling of the melted matters and the melted matters flow in the recess 40 in the shaft 4 as the joint surfaces 4*a* and 6*a* approach each other. According to the joining method, a relatively low voltage is applied only for short time. Consequently, a generation amount itself of the melted matters is small, and the melted matters do diffuse to the outer side of the outer circumferential wall 40*a* of the recess 40. Therefore, the region outside of the recess 40 in the joint surface 4*a* of the shaft 4 and the joint surface 6*a* of the thrust plate 6 are in direct contact with each other without any intervention of the melted matter, and the perpendicularity of the thrust plate 6 with respect to the axis of the shaft 4 can be assured with high precision. That is, the shaft 4 and the thrust plate 6 can be joined to each other while maintaining both coaxiality and perpendicularity between the shaft 4 and the thrust plate. In addition, the shaft 4 and the thrust plate 6 can be joined to each other only by applying a relatively low voltage only for short time, so that the contact portions between the shaft 4 and the thrust plate 6 and the upper and lower electrodes 102 and 104 can be prevented from being melted and occurrence of so-called melt dusts can be prevented.

By forming the projection 42 circumferentially, the contact between the joint surfaces 4*a* and 6*a* of the shaft 4 and the thrust plate 6 becomes line-contact. Even when the pressure is applied and the resistance welding is performed, a force generated by the pressure and energization is distributed in the circumferential direction. Consequently, even when the thickness (dimension in the axial direction) of the thrust plate 6 is reduced, occurrence of deflection can be suppressed. Therefore, without sacrificing the support length of the shaft in the radial bearing part, the invention can contribute to further reduction in the size and thickness of the spindle motor.

Moreover, the joint area between the shaft 4 and the thrust plate 6 increases by making the projection 42 in a circumferential shape, so that variations such as insufficient welding strength can be prevented, and stable quality can be assured.

In addition, also in a spindle motor requested to be small and thin, the thrust plate 6 which is a member separate from the shaft 4 can be used. Since a mark is not formed by a tool in the root portion of the thrust plate unlike the case where the shaft and the thrust plate are formed integrally, the diameter of each of the shaft 4 and the thrust plate 6 can be reduced. Therefore, viscosity resistance of oil is suppressed and the efficiency can be increased, so that the power consumption amount can be reduced.

(5) Modification of Method of Joining Shaft and Thrust Plate

Figure 6:
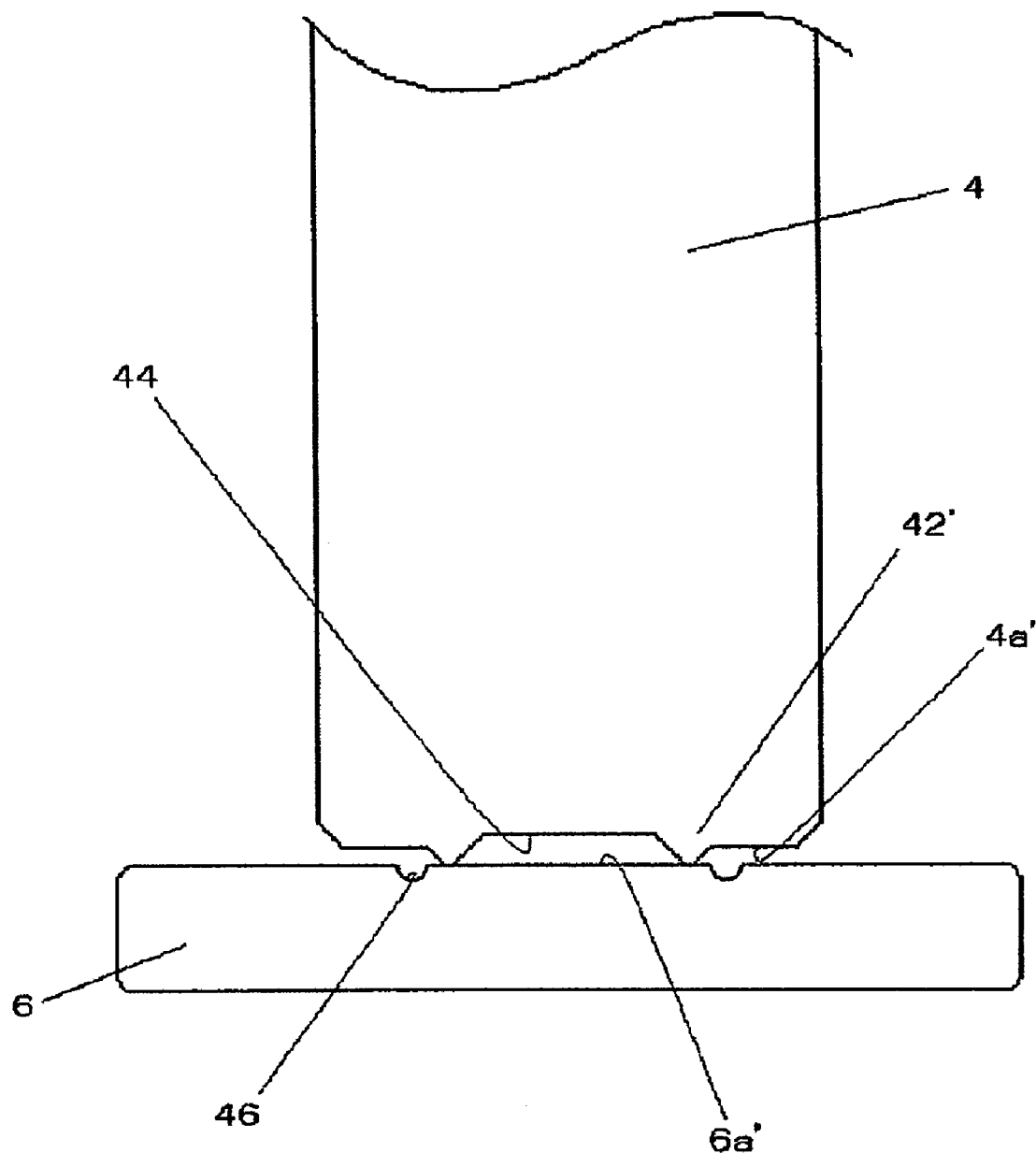
FIG. 6 is an enlarged view of a portion around the joint surfaces of the thrust plate and the shaft as a modification of the embodiment of FIG. 5.

In place of the above-described joining method, as shown in FIG. 6, it is also possible to provide a circumferential projection 42' and a circular recess 44 having a diameter smaller than the projection 42' in a joint surface 4*a'* of the shaft 4 and provide an annular groove 46 having a diameter smaller than the outside diameter of the shaft 4 and larger than the diameter of the projection 42' in a joint surface 6*a'* of the thrust plate 6. In this case, by setting the dimension in the axial direction of the projection 42' to about 0.1 mm to 0.2 mm, the shaft 4 and the thrust plate 6 can be joined to each other by resistance welding by a process similar to the joining method. A matter melted from the portion in which the projection 42' and the joint surface 6*a'* of the thrust plate 6 are in contact with each other is housed in the circular recess 44 and the annular groove 46, so that it is not diffused to the outside of the annular groove 46. Therefore, the contact between the joint surface 4*a* of the shaft 4 in the region on the outside of the annular groove 46 and the joint surface 6*a'* of the thrust plate 6 is not disturbed by the melted matter, so that effects similar to those in the embodiment shown in FIG. 5 can be also obtained.

(6) Another Modification of Method of Joining Shaft and Thrust Plate

FIGS. 7A and 7B show another modification of the joining method. As shown in FIG. 7A, a circular recess 47 having a diameter smaller than the outside diameter of the shaft 4 is provided in a joint surface 6*a"* of the thrust plate 6, a circular projection 48 having a diameter smaller than the outside diameter of the circular recess 47 is provided in a joint surface 4*a"* of the shaft 4 and, further, a circumferential projection 49 having a diameter smaller than the outside diameter of the projection 48 is formed in a position apart from an outer circumferential wall 47*a* of the recess 47 is formed in the circular recess 47 in the thrust plate 6. The height of the circular projection 48 from the joint surface 4*a"* is set to be slightly smaller than the depth of the circular recess 47 (for example, smaller by 0.1 mm).

Also in the case of the modification, the shaft 4 and the thrust plate 6 can be joined to each other by resistance welding by a process similar to the joining method. A melted matter from the contact portion between the projection 49 of the thrust plate 6 and a surface 48*a* of the projection 48 of the shaft 4 is housed in the circular recess 47 and is not diffused to the outside of the circular recess 47. Therefore, the contact between the joint surface 4*a"* of the shaft 4 in the region outside of the circular recess 47 and the joint surface 6*a"* of the thrust plate 6 is not disturbed. In this case as well, effects similar to those of the embodiment shown in FIG. 5 can be obtained. Particularly, in the modification, the shaft 4 and the thrust plate 6 are welded in such a manner that the projection 48 of the shaft 4 enters the recess 47 in the thrust plate 6 as shown in FIG. 7B, so that they can be joined to each other more securely while maintaining both of coaxiality and perpendicularity between the shaft 4 and the thrust plate 6 with high precision.

Figure 7:
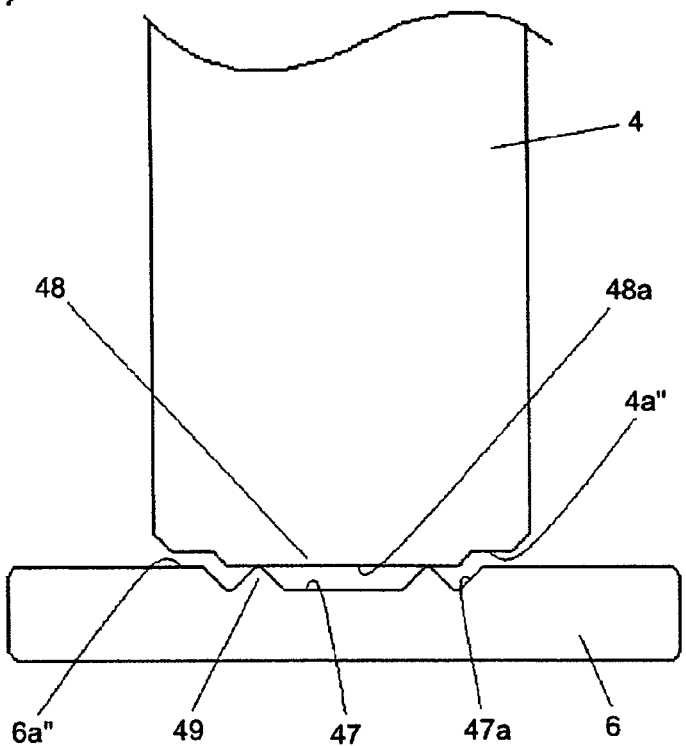
FIGS. 7A and 7B are enlarged views of a portion around the joint surfaces of the thrust plate and the shaft as another modification of the embodiment of FIG. 5, and show a state just before joint and a state after completion of welding, respectively.
Figure 7:
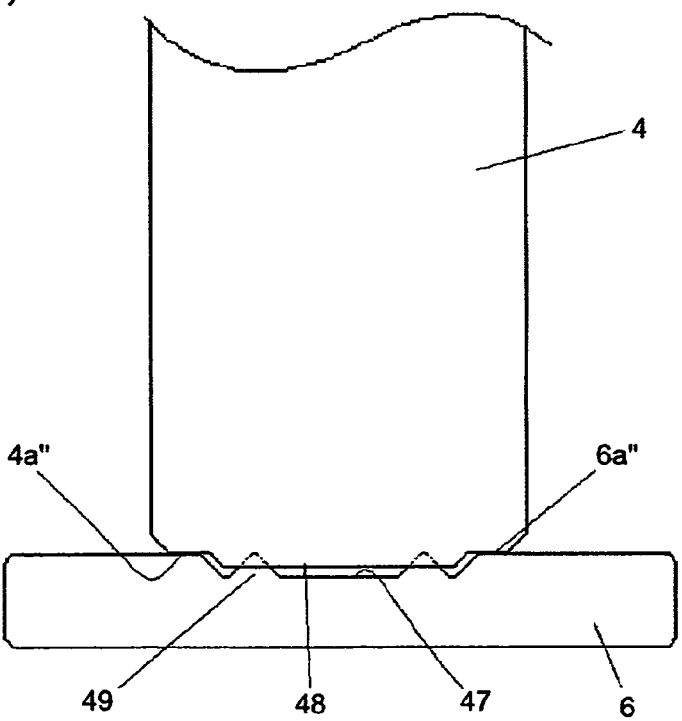

In the modification shown in FIG. 7, the circular recess 47 and the circumferential projection 49 in the thrust plate 6 can be formed by a press work on the thrust plate 6. In this case, the circular recess 47 and the projection 49 can be press molded simultaneously. After the press work on the thrust plate 6, by grinding or polishing both surfaces of the thrust plate 6, even if the tip of the projection 49 is projected from the joint surface 6*a"*, the tip can be removed and the precision of the height of the projection can be assured. In the case of obtaining the thrust plate 6 by press punching a plate member, the circular recess 47 and the projection 49 can be also formed simultaneously at the time of the press work. Moreover, on the shaft 4 side, it is unnecessary to form a recess and a circumferential projection in an end surface of the shaft 4 but it is sufficient to form the circular projection 48 concentrically. Thus, the circular projection 48 can be obtained by a simple cutting work, and the merit from the viewpoint of cost is very large.

(7) Configuration of Disk Driving Apparatus

Figure 8:
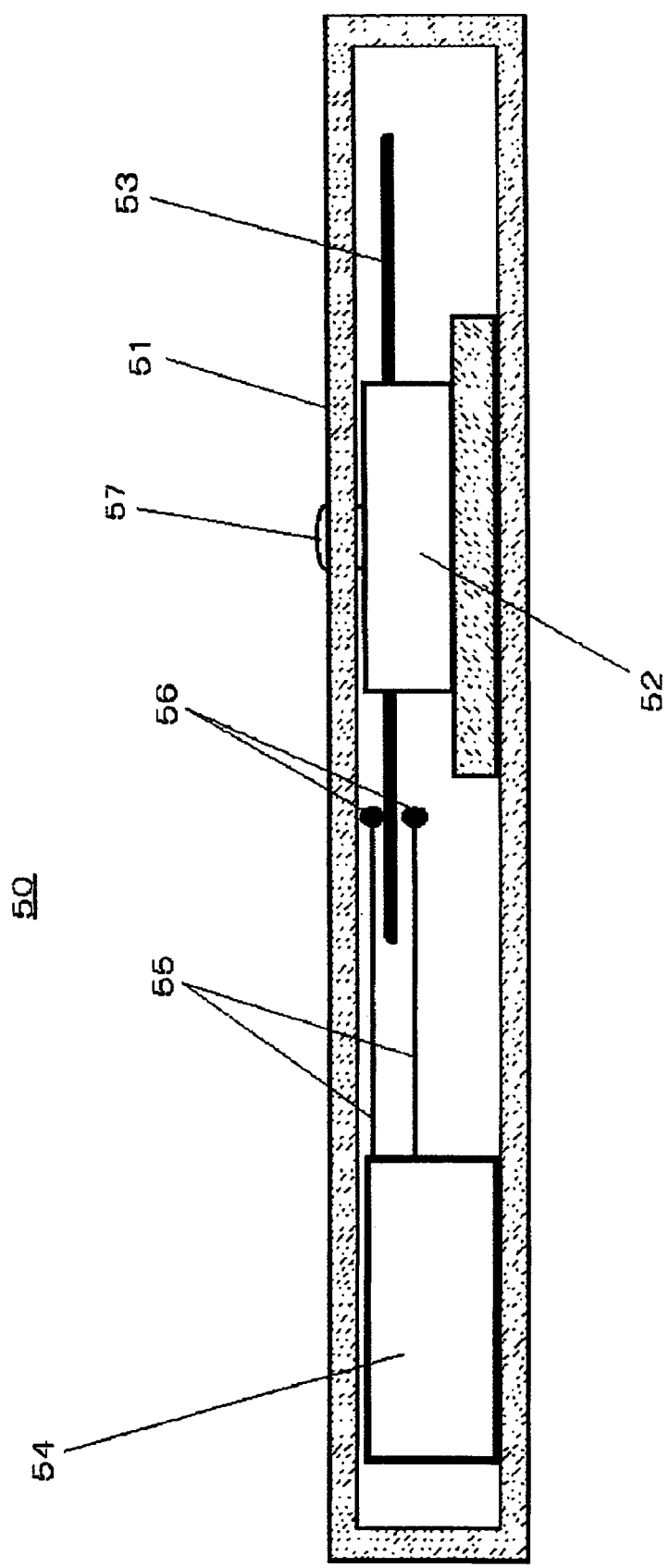
FIG. 8 is a cross section schematically showing the internal configuration of a disk driving apparatus.

FIG. 8 is a schematic diagram showing the internal configuration of a general disk driving apparatus 50. In a housing 51, a clean space in which dusts and the like hardly exist is formed. In the space, a spindle motor 52 to which a disc-shaped disk plate 53 for storing information is attached is mounted. In addition, in the housing 51, a head 56 for reading/writing information from/to the disk plate 53, an arm 55 for supporting the head 56, and an actuator 54 for moving the head 56 and the arm 55 to a required position over the disk plate 53 are disposed.

As the spindle motor 52 of the disk driving apparatus 50, the spindle motor shown in FIG. 1 is used, thereby enabling the thickness and cost of the disk driving apparatus 50 to be reduced while obtaining desired rotation precision.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

For example, in the embodiment, the case of forming the shaft 4 and the thrust plate 6 by using the same material has been described. If there is no inconvenience for resistance welding, the shaft 4 and the thrust plate 6 can be made of different materials.

Although the spindle motor of the so-called shaft rotating type in which the shaft 4 and the thrust plate 6 rotate together with the rotor hub 2 has been described in the foregoing embodiment, obviously, the invention can be also applied to a spindle motor of a so-called shaft fixed type in which the shaft and the thrust plate construct a part of a stationary member and to a hydrodynamic bearing used for the spindle motor.

Further, the material of the sleeve 10 can be properly selected from a solid metal material such as an aluminum material, a copper material, or a stainless steel, a sintered material obtained by sintering copper powders, iron powders, or the like, and the like.

In addition, the bracket 8 is fixed to the housing (indicated as the housing 51 in FIG. 7) of the disk driving apparatus by means such as a screw. By integrating the housing and the bracket, the housing can be also used as the bracket 8.

Although the foregoing embodiment relates to the case of using the thrust plate 6 (as a component of the thrust hydrodynamic bearing) as a disc member, the invention is not limited to the case. Obviously, the invention can be similarly applied to the case of joining a disc member which does not have the thrust hydrodynamic bearing function but has only a coming-off preventing function to an end surface of the shaft.

What is claimed is:

1. An assemblage for forming a hydrodynamic bearing, the assemblage comprising:
   a shaft, unit including
      a shaft having a cylindrical outer circumferential surface defining a first side of a radial hydrodynamic bearing section, and, orthogonal to the cylindrical outer circumferential surface, an end surface where a first joint surface is formed, and
      a disc member of diameter larger than that of said shaft and having a flat surface where a second joint surface is formed, for facing the end surface of the shaft to be joined and fixed thereto;
   a bearing member having a cylindrical inner circumferential surface opposing and rotatable relative to the cylindrical outer circumferential surface of said shaft, to define a second side of the radial hydrodynamic bearing section;
   an annular, axially protruding projection of diameter smaller than that of said shaft and configured so as to melt under a predetermined applied voltage, said projection provided on one of either said first or second joint surfaces; and
   a recess outer peripherally of diameter smaller than outside that of said shaft yet larger than that of said projection, and dimensioned so as to receive said projection as molten matter, said recess provided on one of either said first or second joint surfaces; wherein
   by bringing said first and second joint surfaces into contact and applying predetermined voltage across said shaft and said disc member, the said projection becomes molten matter and flows into said recess, bringing said end surface of said shaft and a said flat surface of said disc member into contact with each other and welding said shaft and said disc member together.

2. The hydrodynamic bearing assemblage according to claim 1, wherein said recess is circular, and said projection is provided projecting from the base of said recess.

3. The hydrodynamic bearing assemblage according to claim 2, wherein said recess and said projection are provided on said first joint surface.

4. A method of manufacturing a hydrodynamic bearing from a hydrodynamic bearing assemblage according to claim 2, comprising the steps of:
   applying a predetermined voltage across said shaft and said disc member in a state in which said shaft and said disc member are retained under pressure orthogonal to the axial direction and so as to bring said first and second joint surfaces into contact with each other;
   melting said projection until the end surface of said shaft and the flat surface of said disc member come into contact with each other, and allowing molten matter from the projection to enter said recess, thereby welding said shaft and said disc member together.

5. The hydrodynamic bearing assemblage according to claim 1, wherein said recess is in the form of an annular groove and is provided on the one of said first and second joint surfaces on which said projection is not provided.

6. The hydrodynamic bearing according to claim 5 wherein the one of said first and second joint surfaces on which said projection is provided into a hollow to the inner circumferential side of said projection.

7. A method of manufacturing a hydrodynamic bearing from a hydrodynamic bearing assemblage according to claim 5, comprising the steps of:
   applying a predetermined voltage across said shaft and said disc member in a state in which said shaft and said disc member are retained under pressure orthogonal to the axial direction and so as to bring said first and second joint surfaces into contact with each other;
   melting said projection until the end surface of said shaft and the flat surface of said disc member come into contact with each other, and allowing molten matter from the projection to enter said recess, thereby welding said shaft and said disc member together.

8. The hydrodynamic bearing assemblage according to claim 6, wherein said projection is provided on said first joint surface, and said annular groove is provided in said second joint surface.

9. The hydrodynamic bearing assemblage according to claim 1, wherein said projection and said recess are both provided on the same one of either said first or second joint surface, on the other of said first or second joint surfaces, a circular protuberance is provided having an outside diameter smaller than the outer periphery of said recess and larger than said projection, and projecting axially from said other of said first or second joint surfaces.

10. The hydrodynamic bearing assemblage according to claim 9, wherein said recess is annular and, said projection is positioned within the recess.

11. The hydrodynamic bearing assemblage according to claim 9, wherein said recess and said projection are provided on said second joint surface, and said protuberance is provided on said first joint surface.

12. The hydrodynamic bearing assemblage according to claim 11, wherein said recess and projection are formed by a press-working operation on said disc member.

13. A method of manufacturing a hydrodynamic bearing from a hydrodynamic bearing assemblage according to claim 9, comprising the steps of:
applying a predetermined voltage across said shaft and said disc member in a state in which said shaft and said disc member are retained under pressure orthogonal to the axial direction and so as to bring said first and second joint surfaces into contact with each other;
melting said projection until the end surface of said shaft and the flat surface of said disc member come into contact with each other, and allowing molten matter from the projection to enter said recess, thereby welding said shaft and said disc member together.

14. The hydrodynamic bearing assemblage according to claim 1, wherein said bearing member has a bearing surface facing one or both of surfaces of said, and a thrust hydrodynamic bearing part is formed between said disc member and said bearing member.

15. A method of manufacturing a hydrodynamic bearing from a hydrodynamic bearing assemblage according to claim 1, comprising the steps of:
applying a predetermined voltage across said shaft and disc member in a state in which pressure is applied on said shaft and said disc member to bring said first and second joint surfaces into contact with each other;
melting said projection until the end surface of said shaft and the flat surface of said disc member come into contact with each other, and allowing molten matter from the projection to enter said recess, thereby welding said shaft and said disc member together.

16. A spindle motor comprising:
hydrodynamic bearing manufactured according to claim 15
a rotor coupled to one of said shaft and said bearing member and having a rotor magnet; and
a stator constructing a stationary member in cooperation of the other one of said shaft and said bearing member and disposed so as to face said rotor magnet.

17. A recording disk apparatus comprising a spindle motor according to claim 16 wherein a recording disk is mounted on said rotor so as to rotate integrally with the rotor, and provided with a recording/reproduction head for reading/writing information from/to the recording disk.

* * * * *